United States Patent
Fleischmann et al.

(10) Patent No.: US 7,782,449 B2
(45) Date of Patent: Aug. 24, 2010

(54) METHOD AND APPARATUS FOR ANALYZING AN OPTICAL DEVICE

(75) Inventors: Friedrich Fleischmann, Delmenhorst (DE); Thomas Henning, Bremen (DE)

(73) Assignee: Hochschule Bremen, Bremen (DE)

( * ) Notice: Subject to any disclaimer, the term of this patent is extended or adjusted under 35 U.S.C. 154(b) by 464 days.

(21) Appl. No.: 11/672,463

(22) Filed: Feb. 7, 2007

(65) Prior Publication Data
US 2007/0188741 A1    Aug. 16, 2007

(30) Foreign Application Priority Data
Feb. 10, 2006 (DE) .................. 10 2006 006 297
Jan. 25, 2007 (DE) .................. 10 2007 003 681

(51) Int. Cl.
*G01B 9/00* (2006.01)
(52) U.S. Cl. ...................................... 356/124
(58) Field of Classification Search .............. 356/124
See application file for complete search history.

(56) References Cited

U.S. PATENT DOCUMENTS

| | | | |
|---|---|---|---|
| 2,897,722 A * | 8/1959 | Gunter, Jr. et al. | 356/126 |
| 3,266,368 A * | 8/1966 | Santinelli | 356/126 |
| 4,344,707 A * | 8/1982 | Massie | 356/521 |
| 4,641,962 A | 2/1987 | Sueda et al. | |
| 4,815,844 A * | 3/1989 | Schmalfuss et al. | 359/239.7 |
| 5,289,254 A * | 2/1994 | Braunecker et al. | 356/124 |
| 5,294,971 A * | 3/1994 | Braunecker et al. | 356/121 |
| 5,855,074 A | 1/1999 | Abitbol et al. | |
| 6,072,570 A | 6/2000 | Chipman et al. | |
| 6,262,818 B1 * | 7/2001 | Cuche et al. | 359/9 |
| 6,530,917 B1 * | 3/2003 | Seiler et al. | 606/5 |
| 6,761,454 B2 * | 7/2004 | Lai et al. | 351/216 |
| 6,819,413 B2 * | 11/2004 | Neal et al. | 356/123 |
| 2003/0151721 A1 * | 8/2003 | Lai et al. | 351/212 |
| 2004/0145702 A1 * | 7/2004 | Liang | 351/200 |
| 2005/0174565 A1 | 8/2005 | Veitch | |
| 2006/0072104 A1 | 4/2006 | Engel et al. | |

FOREIGN PATENT DOCUMENTS

DE    38 42 144 A1    6/1990

(Continued)

*Primary Examiner*—Tarifur R. Chowdhury
*Assistant Examiner*—Isiaka O Akanbi
(74) *Attorney, Agent, or Firm*—Arent Fox LLP; James Bindseil

(57) ABSTRACT

Described are a method and apparatus for analysing an optical device, including: a) arranging an illuminating device which generates a test beam, the optical device that the test beam passes and a position-resolving sensor device which detects the test beam, relative to each other in a reference position that establishes a reference beam path; b) transmitting the test beam in a plurality of relative positions off set with respect to the reference position, relative to the reference position, the test beam being incident upon a measuring point assigned to the respective relative position on the optical device; c) detecting, for a respective relative position, a position of incidence of the test beam, after it passes the optical device, on one or a plurality of planes of detection offset relative to each other; d) determining the beam path of the test beam from the positions of incidence detected in step c) for each relative position and calculating optical characteristics of the optical device.

19 Claims, 9 Drawing Sheets

FOREIGN PATENT DOCUMENTS

| | | |
|---|---|---|
| DE | 4003698 A1 | 8/1991 |
| DE | 4003699 A1 | 8/1991 |
| DE | 695 28 647 T2 | 7/2003 |
| DE | 69810480 T2 | 11/2003 |
| DE | 10327019 A1 | 12/2004 |

* cited by examiner

METHOD AND APPARATUS FOR ANALYZING AN OPTICAL DEVICE

RELATED APPLICATIONS

The present application is based on, and claims priority from, German Application Numbers 102006006297.3-51, filed Feb. 10, 2006 and 102007003681.9, filed Jan. 25, 2007, the disclosures of which are hereby incorporated by reference herein in their entirety.

BACKGROUND

The invention relates to a method and apparatus for analysing an optical device. The invention relates in particular to a method for the quantitative determination of characteristics of imaging and non-imaging optical systems, and a corresponding device for implementing such a method.

In the manufacture and testing of optical elements and systems, e.g. lenses or imaging optics, it is necessary to evaluate the imaging quality or, more generally, the optical properties. As a rule the properties are described quantitatively for this purpose in the case of higher quality optics. An exact quantitative evaluation of the optical components is also necessary to correct or compensate for inadequacies observed in given optics. Here it is desirable to obtain as wide a coverage of the error types as possible and, in particular, to determine their dependence on wavelength.

A multiplicity of primarily high quality methods are known from the state of the art for determining the properties of optical devices. Such methods include, for example, the star test and other types of schlieren tests, as well as interferometric methods.

Although highly accurate topographical data on the components are determined in the interferometric analysis of the geometry of optical components, no information is obtained on intrinsic properties of the components, e.g. possible material inhomogeneities which influence the quality of the component. In most cases interferometric methods require further optical components whose influence on the measurement must be minimised by correspondingly high quality construction of the components or by compensation. All interferometric methods suffer from the disadvantage that they are technically very demanding and are associated with high costs. Furthermore, these methods are susceptible to interference due to vibrations and air movements, for example, and they are limited to a single wavelength. In addition, interferometric tests on large apertures are technically extremely demanding and correspondingly expensive.

Methods are also known from the state of the art for measuring the optical wave front after it passes through an optical component. In the so-called Hartmann method a diaphragm mask or diaphragm array is inserted in the beam path behind the optical component to be analyzed. The geometric course of the sub-path is determined with a position-resolving sensor, e.g. a CCD camera, from the centroid of the intensity distribution on the sensor and the position of the associated aperture of the diaphragm array, and from this the tilt of the wave front at each aperture of the diaphragm. Unlike interferometric methods, the method referred to is much simpler in structure. However, the Hartmann method suffers from the disadvantage that the achievable spatial resolution is predetermined by the distance between the apertures in the diaphragm mask, and is therefore spatially restricted. The Hartmann method is therefore only of limited application, particularly for measuring small optics. Moreover, non-uniform distribution of the wave front in front of the diaphragm array may, in the Hartmann method, result in incorrect determination of the centroids of the distribution and hence the tilt of the wave front. Suitable optics are therefore required for beam homogenisation and in particular for testing large apertures. Moreover, for a high wave front tilt an appreciable deflection takes place at the diaphragm apertures.

An extension of the Hartmann method, the so-called Shack-Hartmann method, uses a micro-lens array instead of a diaphragm mask. The position-resolving sensor is located in the focal plane of the lens, resulting in higher light sensitivity and considerable insensitivity to inhomogeneous intensity distributions in front of the lens array. Such micro-lens arrays are expensive and costly to manufacture, introduce their own imaging errors into the measurement and are limited in their spatial extension at the top and bottom. In the Hartmann and Shack-Hartmann methods different diaphragm and micro-lens arrays are also required for different geometries of the optics to be analyzed.

Publication DE 103 27 019 A1 discloses a method for determining the imaging quality of an optical imaging system. This method is based on a reconstruction of the wave front, for example by the Gerchberg-Saxton method of prior art. This method, involving a lower technical expenditure, is more accurate than the methods described above. Moreover, the method also enables initially unknown samples to be tested. The disadvantage of this method is that partially coherent light must be used and imaging optics are always required to test the sample. Furthermore, the method is highly susceptible to noise and requires expensive methods for signal processing.

SUMMARY

The described aspects provide a method and apparatus for analysing an optical device to obtain a quantitative analysis of the characteristics of the optical device at low technical expenditure and with a high degree of accuracy.

In a method according to the invention an illuminating device, which generates a test beam, the optical device to be analyzed and a position-resolving sensor device, which detects the test beam, are arranged in a reference position relative to each other. Here test beam is understood, in particular, to mean a beam comprising collimated and/or focussed electromagnetic radiation. This reference position is used to establish a reference beam path which comprises a first direction, which is the direction of the test beam transmitted in the reference position from the illuminating device and directed towards the optical device, and a second direction, which is the direction of the test beam received in the reference position from the sensor device after it passes the optical device.

Starting from this reference position, the test beam transmitted from the illuminating device is, in the method according to the invention, arranged in a plurality of relative positions to the reference position. This arrangement can be obtained by altering the position of the test beam or by altering the position of the components used in the method according to the invention, i.e. the test beam itself need not necessarily be displaced when arranging the test beam in a relative position. In the method according to the invention, the test beam is therefore arranged so that the direction of the test beam in the respective relative position is displaced to the first direction of the relative beam path and/or the illuminating device and the optical device are displaced relative to each other in the respective relative position to the reference position, the displacement being achieved by any means. In particular, either the optical device only or the illuminating device only can be displaced, or both components can be displaced. After the test beam has been arranged in the respective relative position, the test beam is incident upon a measuring point on the optical device assigned to the respective relative position.

For a respective relative position the position of incidence of the beam path, after it passes the optical device in one or a plurality, preferably at least two detection planes offset relative to each other along the second direction of the reference beam path, is detected by the sensor device. The beam path of the test beam is then determined from the detected incidence positions after it passes the optical device for each relative position, and optical characteristics of the optical device are calculated from this.

Because of the use of test beams which are arranged in different relative positions, imaging optics may be dispensed with in the method according to the invention. In addition, objects with different optical and mechanical parameters may be analyzed with different optical and mechanical parameters with selectable position resolution and accuracy without extensive conversions and the production of special components. Here only the number of relative positions and the correspondingly assigned measuring points need be established according to the desired accuracy. A further advantage of the method is that the position-resolving is not limited by apertures in a diaphragm, as in the Hartmann method, or by the sizes of micro-lenses, as in the Shack-Hartmann method. Instead the position-resolution can be increased by finer scanning of the measuring points or reduced by coarse scanning for faster, less accurate characterisation of the optical device. In particular, no special production of new diaphragm or lens arrays are required when adapting the measurement to different optical devices or measurement accuracies. Furthermore, the accuracy of the measurement in the method according to the invention can easily be increased by determining the points of incidence in a multiplicity of detection planes. Moreover, large apertures can be tested by the method according to the invention without additional apparative expenditure, as is necessary in the case of interferometers. The method according to the invention also makes possible the characterisation of optical elements and systems, even those that are not imaging, as well as of samples whose characteristics are not yet known.

Any types of optical devices may be analyzed by the method according to the invention. Here particular consideration must be given to the fact that the test beam may both go through the optical device and may be reflected on the optical device. The term used above, "passing the optical device", therefore includes all possible deflection of the beam path in the optical device, and is not limited to the passage of the beam through the optical device.

In a particularly preferred design of the invention, the optical device comprises a lens through which the test beam goes due to the light sensitivity of the lens. As already mentioned, however, the test beam can also be deflected by other means on the optical device, in particular being scattered or reflected. Here the optical device may comprise a reflecting measuring object, in particular a wafer and/or a plate and/or a part of a micromechanical sensor. The optical device may, if necessary, also be a combination of translucent and reflecting objects, so that the test beam at least partially passes through the optical device and is also scattered or reflected at least partially in the optical device.

If the test beam is reflected on the optical device, a beam splitter is positioned between the illuminating device and the optical device in a preferred design of the invention, which splitter at least partially allows to pass through a test beam transmitted from the illuminating device and at least partially reflects a test beam reflected from the optical device.

To provide an extremely simple evaluation of the optical characteristics of the device to be analyzed, the test beams transmitted in the respective relative positions are preferably parallel to the first direction of the reference beam path.

In a preferred embodiment of the method according to the invention, the gradient field of the optical wave front and/or the optical wave front, after passing the optical device and/or values dependent on the optical wave front, are calculated from the determined beam paths of the test beams. The function of a wave front sensor is therefore achieved by the method according to the invention, the analysis of the wave front being much more accurate compared to the wave front sensors of prior art according to the Hartmann or Shack-Hartmann method. Here the optical wave front and dependent values are preferably calculated by means of the Zernicke polynomials, which are adequately known from optics.

In a further embodiment of the method according to the invention, the beam path of a particular test beam is easily determined by linear regression of the incidence positions of the test beam in the planes of detection.

In a particularly preferred embodiment of the invention, an optical axis is established by the optical device to be analyzed and the reference position is in this case chosen so that the reference beam path corresponds essentially to the course of the optical axis and the first and second directions of the reference beam path coincide. Optical imaging errors may therefore be characterised effectively, particularly in the analysis of lenses.

In a further embodiment of the method according to the invention, the test beam is arranged in a plurality of relative positions relative to the reference position by simply displacing the illuminating device and/or the optical device, this displacement taking place in particular in a plane that is essentially perpendicular to the first direction of the reference beam path.

In a further embodiment of the method according to the invention, the measuring points assigned to each of the test beams are positioned essentially in the shape of a grid with predetermined distances between them on the optical device for achieving high measuring accuracies in particular.

In a further particularly preferred embodiment of the invention, the determination of the beam path of the test beam, after passing the optical device, is facilitated in that the plane or planes of detection are arranged essentially perpendicularly to the second direction of the reference beam path.

In a further embodiment of the method according to the invention, the positions of incidence of each test beam in a plane of detection are determined by evaluating the intensity distribution detected by the sensor device in the plane of detection. The centroid of the intensity distribution is preferably determined by methods sufficiently known from the state of the art, the position of this centroid being equated with the position of incidence of each test beam.

In a further embodiment of the invention, the planes of detection offset with respect to each other are easily adjusted by displacing the sensor device along the second direction of the reference beam path.

The method according to the invention is implemented extremely easily in that each individual plane of detection is set only once, and in that after a plane of detection is set, the test beam is arranged in essentially all the relative positions in order to detect essentially all positions of incidence of the test beam in the set plane of detection. This accelerates the method because the scanning of a plurality of measuring points can be carried out much faster than displacement of the plane of detection.

In a further preferred embodiment of the invention, an illuminating device with a light source, a collimator and an aperture, is used to generate test beams, the illuminating device preferably being a white light source. By arranging one or a plurality of spectral filters in the beam paths of the test beams, optical characteristics of the device to be analyzed, which depend on the wavelength, e.g. chromatic aberrations, can be tested using such a white light source.

The method may preferably be repeated by using different spectral filters for different wavelengths of the test beam.

Instead of or in addition to the use of an illuminating device with a light source, collimator and diaphragm, an illuminating device with a laser may also be used.

In a particularly preferred embodiment of the invention, a CCD camera and/or a line scan camera and/or a diode device is used as a sensor device for detecting the positions of incidence of the test beams.

In addition to the method according to the invention described above, the invention also relates to apparatus for analysing an optical device, the apparatus comprising:

an illuminating device for generating a test beam;
a position-resolving sensor device for detecting the test beam after it passes the optical device;
where the optical device to be analyzed, the illuminating device and the sensor device can be arranged relative to each other in a reference position, and where the reference position establishes a reference beam path which comprises a first direction, which is the direction of the test beam transmitted from the illuminating device in the reference position and directed towards the optical device, and a second direction which is the direction of the test beam received from the sensor device in the reference position after the beam passes the optical device;
a positioning device for arranging the test beam transmitted from the illuminating device in a plurality of relative positions to the reference position so that the direction of the test beam is displaced in the respective relative position, and is preferably parallel to the first direction, and/or so that the illuminating device and the optical device are offset, in the respective relative position, with respect to each other relative to the reference position, the test beam inciding upon a measuring point assigned to the respective relative position on the optical device;
where the sensor device is designed so that for each relative position it detects the position of incidence of the test beam after it passes the optical device in one or a plurality planes of detection offset relative to each other along the second direction;
a computer unit which is designed so that for each relative position it determines the beam path of the test beam, after it passes the optical device and calculates from this optical characteristics of the optical device.

The positioning device is here preferably designed so that it displaces the illuminating device and/or the optical device for arranging the test beam in different relative positions, preferably essentially perpendicular to the first direction. A suitable displacement device, which displaces the sensor device in the different planes, is preferably provided for setting the different planes of detection in the device according to the invention.

In a particularly preferred embodiment of the invention the analysis of the optical device takes place in automated fashion, the positioning device and/or the displacement device being controlled by the computer unit and displaced in automated fashion into the different relative positions and/or planes of detection.

In a particularly preferred embodiment of the device according to the invention, a beam splitter is arranged between the illuminating device and the optical device, which splitter at least partially transmits the test beam from the illuminating device and at least partially detects a test beam reflected from the optical device.

DETAILED DESCRIPTION

Figure 1:
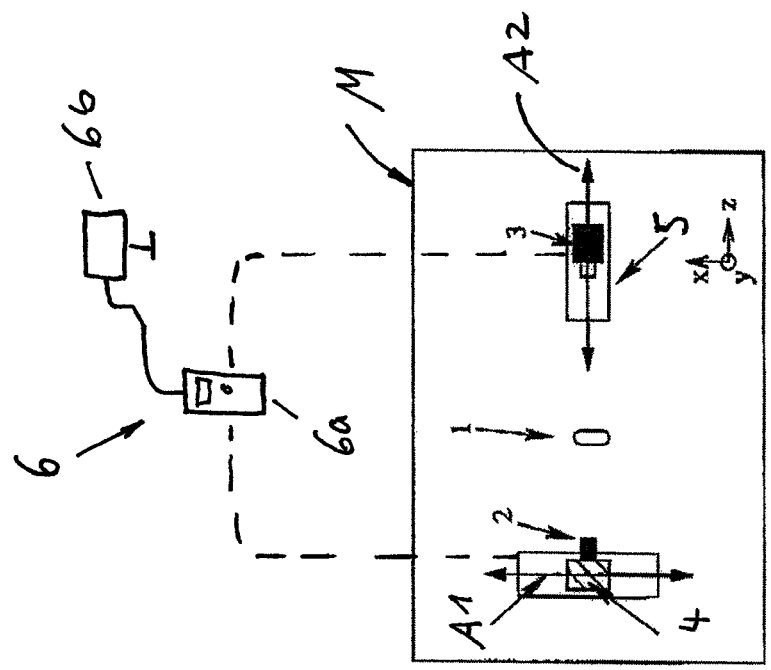
FIG. 1 is a diagrammatic elevation of a first embodiment of a device for implementing a method according to the invention.

FIG. 1 shows in elevation, from the top, the structure of the first embodiment of apparatus according to the invention for analysing an optical device, the optical device in the embodiment described here being a lens 1, which is arranged between an illuminating device 2 and a sensor system 3 on a measuring table M. In the embodiment shown here, illuminating device 2 comprises a white light source whose light beams run through a collimator and an aperture, thereby generating a spatially limited test beam in the form of a parallel beam cluster, the test beam having a diameter of 1 mm and smaller, for example. If necessary, a spectral filter can be inserted in or in front of the illuminating device in order to generate monochromatic test beams. This enables optical characteristics of lens 1 dependent on the light wavelength, particularly the chromatic aberration. The test beams transmitted from illuminating device 2 are directed towards lens 1 and, after passing through the lens, reach sensor system 3, which in the embodiment described here is an intensity sensor in the form of a CCD camera.

Because of the arrangement shown in FIG. 1, a Cartesian coordinate system is established whose x- and z-axes lie parallel to the plane of measuring table M and whose y-axis extends perpendicularly upwards from the measuring table. In the method according to the invention, illuminating device 2 is displaceable in the x-direction and y-direction, which is indicated diagrammatically by double arrow A1 in FIG. 1. For this purpose illuminating device 2 is secured to a suitable positioning system 4 which enables the position of the illuminating device in the plane spanned by the x- and y-axis, for example, by means of suitable travel rails.

Further, the test beams generated by illuminating device 2, which reach sensor system 3 via lens 1, are detected in different planes of detection offset relative to each other. To achieve this, intensity sensor 3 is secured to a suitable displacing device in the embodiment described here, which device guarantees displacement of the sensor in the z-direction. The displaceability of the sensor is indicated in FIG. 1 by double arrow A2. The positioning of illuminating device 2 and sensor 3 relative to lens 1, and the evaluation of the measurements carried out, are carried out by means of a computer unit 6 which is indicated in diagrammatic form only in FIG. 1. Here the computer unit comprises a personal computer 6*a*, which is connected to a corresponding monitor 6*b* on which the results of the method according to the invention are displayed. The connection of computer unit 6 to illuminating device 2 and sensor 3 is indicated in FIG. 1 in diagrammatic form by dotted lines. Illuminating device 2 and sensor 3 can be displaced into different spatial positions in automated fashion by control commands from computer unit 6 by means of positioning system 4 and displacing device 5, suitable electric motors being provided for this purpose in positioning system 4 or displacing device 5.

In the method according to the invention, illuminating device 2 and sensor system 3 are first adjusted with respect to lens 1 so that a test beam transmitted from device 2 runs precisely through the optical axis and is detected centrally on the pixel field of CCD camera 3. The position thus set corresponds to the reference position within the meaning of claim 1. This position can be set either in automated fashion by a suitable program in computer unit 6 or by manual adjustment of illuminating device 2 or sensor 3 by a user who moves these components into different positions and observes the change of position of the test beam after it has passed through the lens. The position of the test beam is in this case detected by its intensity distribution on sensor 3 and is displayed on monitor 6*b* for the user by means of computer 6*a*.

Figure 2:
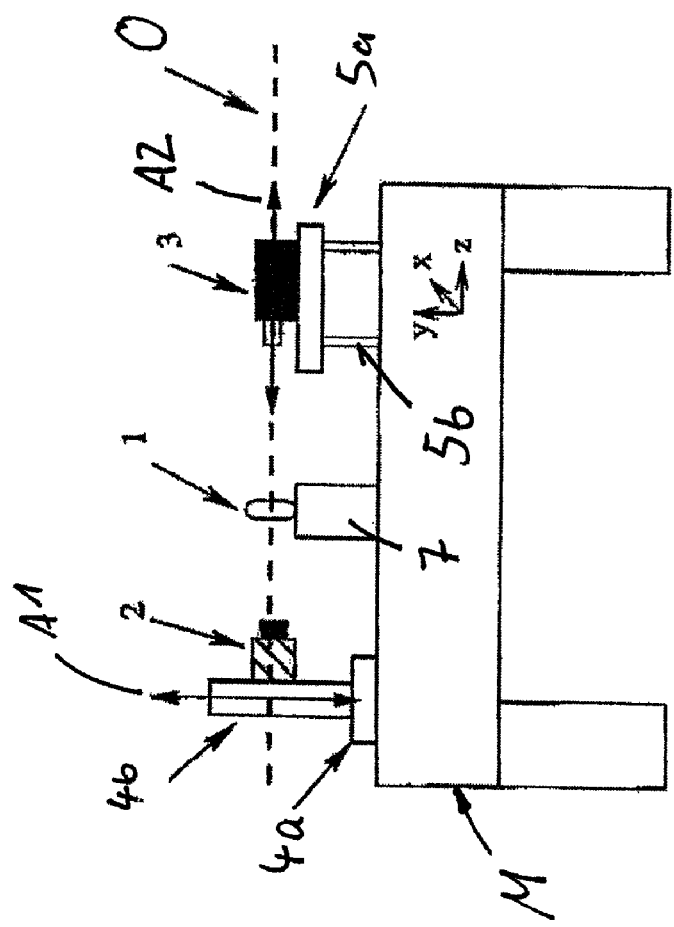
FIG. 2 is a side view of the apparatus shown in FIG. 1.

The arrangement of the apparatus according to the invention, in the reference position defined above, can also be seen in the side view in FIG. 2. In particular, the optical axis O, which runs centrally through illuminating device 2 in the reference position, lens 1 arranged on a base 7 and sensor system 3, is drawn in FIG. 2. The positioning system for illuminating device 2 is also shown diagrammatically in FIG. 2. This system comprises a horizontal travel rail 4*a* for moving the illuminating device in the x-direction and a vertical travel rail 4*b* for moving the illuminating device in the y-direction. In addition, the displacing device is indicated in diagrammatic manner in the form of a horizontal travel rail 5*a* for moving sensor 3 in the z-direction, rail 5*a* being arranged on a suitable base 5*b*.

After the reference position is set, the reference system for further development of the process is established in computer unit 6. Illuminating device 2 is now moved in a first measuring step perpendicularly to optical axis O in the x- and y-directions at different measuring positions on lens 1. This process preferably takes place in automated fashion by means of a suitable program in computer unit 6, a suitable grid of measuring points being predetermined by the program. This grid is defined by predetermined distances of the measuring points from each other and is preferably chosen so that essentially the entire surface of lens 1 is scanned. Typical scans are rectangular fields of 10×10 or 50×50 or 100×100 measuring points.

Figure 3:
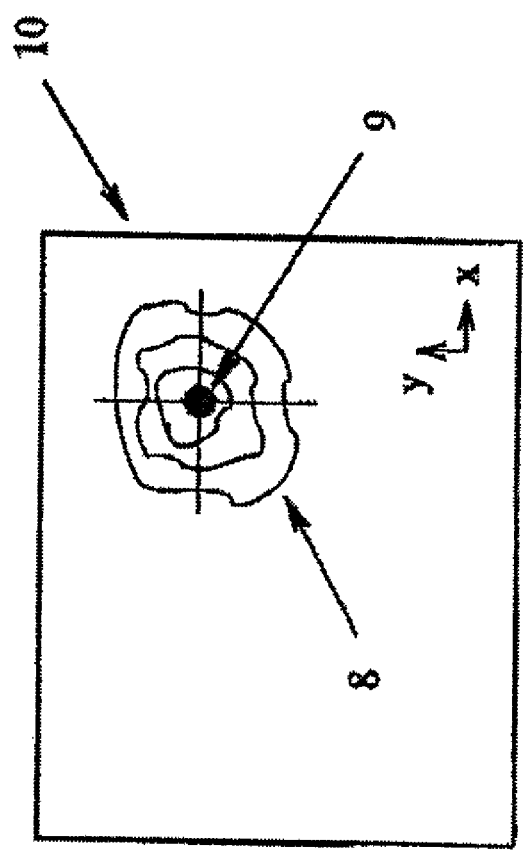
FIG. 3 is a diagrammatic elevation of a plane of detection for detecting the position of incidence of a test beam used in a method according to the invention.

FIG. 3 shows diagrammatically a plane of detection 10 in sensor system 3, which in the embodiment described here represents the pixel field of a CCD camera. A scenario is shown in which a test beam is incident upon the detection field. Here a suitable intensity distribution 8 of the test beam is detected, and centroid 9 of the test beam is then calculated by means of computer unit 6. This centroid is the position of incidence of the test beam on plane of detection 10 within the meaning of claim 1. The centroid of the intensity distribution is in this case determined according to methods of prior art.

As mentioned above, measuring points on the lens are scanned by means of the test beam. In this case, plane of detection 10 of sensor 3 is located in a first plane of observation. In this plane of observation all the measuring positions are then moved down on the lens by displacement of illuminating device 2, the position of incidence of the corresponding test beam in the first plane of observation being detected by means of the centroid calculation explained in FIG. 3. After all the measuring points have been scanned on lens 1 and the corresponding positions of incidence detected, plane of detection 10 is displaced into further positions along the z-direction, all the measuring points again being scanned on the lens in each of the individual positions, and the corresponding positions of incidence of the test beams being detected in the plane of detection.

Figure 4:
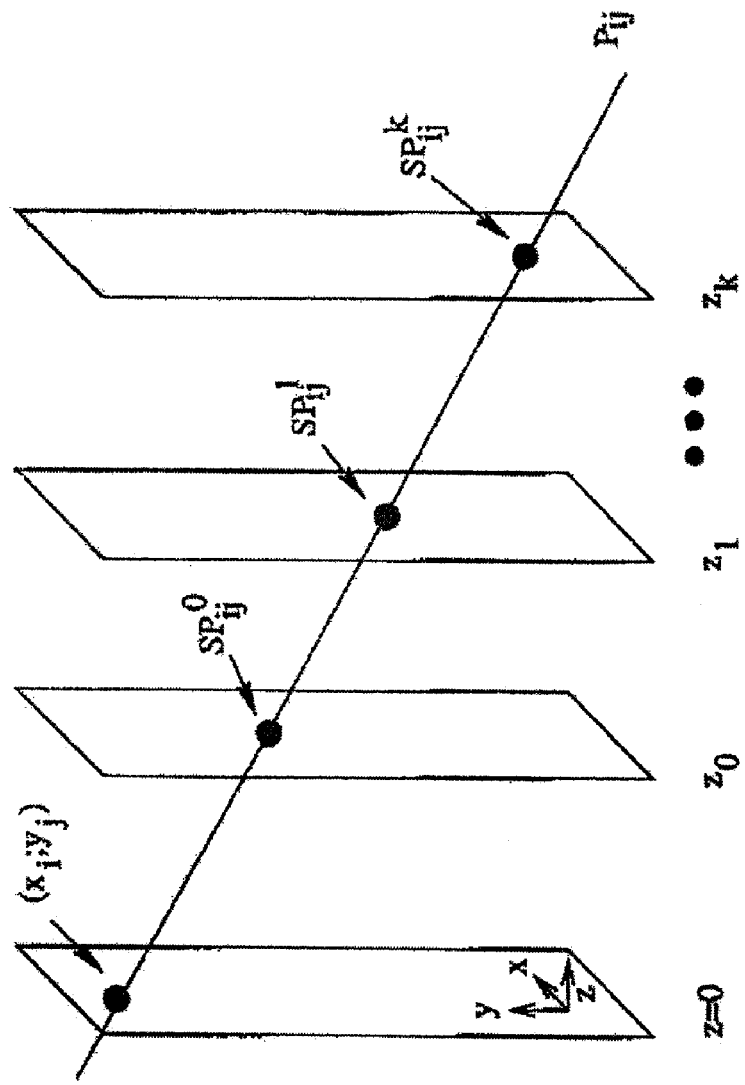
FIG. 4 is a diagrammatic perspective view of a plurality of planes of detection and the points of incidence of a test beam in the apparatus shown in FIG. 1 for an explanation of the calculation of the path of the test beam according to method of the invention.

The process just described is indicated once again in diagrammatic form in FIG. 4. In FIG. 4 plane z=0 denotes the plane on lens 1 on which the measuring points to be scanned are located. One of these measuring points $(x_i; y_j)$ is represented in FIG. 4 in this plane. The corresponding test beam $P_{ij}$, which is incident vertically onto the plane z=0, runs through this measuring point and is deflected by the lens. The sensor system is moved according to the method of the invention into the different planes of detection $z_0, z_1, \ldots z_k$. The corresponding centroid of the intensity distribution $SP_{ij}^0$, $SP_{ij}^1, \ldots SP_{ij}^k$ is then determined for each measuring point $(x_i; y_j)$. The positions of the centroids, which correspond to the positions of incidence of test beam $P_{ij}$, are processed in computer unit 6, the spatial path of test beam $P_{ij}$ after it passes through the lens being calculated by linear regression.

The method according to the invention therefore supplies a corresponding path of test beams $P_{ij}$ for all measuring points $(x_i; x_j)$. In the ideal case of an imaging lens without lens errors, all the test points $P_{ij}$ converge in one focal point, since all the test beams run parallel when incident upon the plane of measurement z=0. Deviations from this ideal case and corresponding lens errors can now be adequately determined with the method according to the invention by calculations adequately known from the state of the art. In particular, the shape of the wave front can be determined after it passes through the lens. The calculations are preferably carried out with the aid of Zernicke polynomials, the coefficients of the polynomials indicating corresponding lens errors. In the embodiment described here the gradient field of the wave front is known on the basis of the spatial position of the individual test beams $P_{ij}$, from which the corresponding coefficients can be determined numerically by means of the derivations of the Zernicke polynomials. The calculations are carried out by a suitable program in computer 6*a* and the results are displayed on monitor 6*b*. Instead of determining the wave front by means of Zernicke polynomials, any other methods of prior art may be used to determine the shape of the wave front.

As indicated in the previous statements, the method according to the invention provides by very simple means, through the use of test beams, information on the optical properties of an optical component. In particular, no further optics are used for the analysis in the method and a very high position resolution can be achieved by scanning individual measuring points on the optical device to be analyzed. The method according to the invention has been described above taking the example of a lens to be analyzed, but the method may also be used for characterising non-imaging optical elements and systems and samples whose characteristics are not known. Reflecting optical systems can also be analyzed with the method, and in this case the test beam reflected on the optical system is detected by the sensor system and the illuminating device, the optical component and sensor are not arranged in one line.

Further embodiments of the method according to the invention and the apparatus according to the invention are described in the following, a reflecting measuring object being analyzed in these embodiments.

Figure 5:
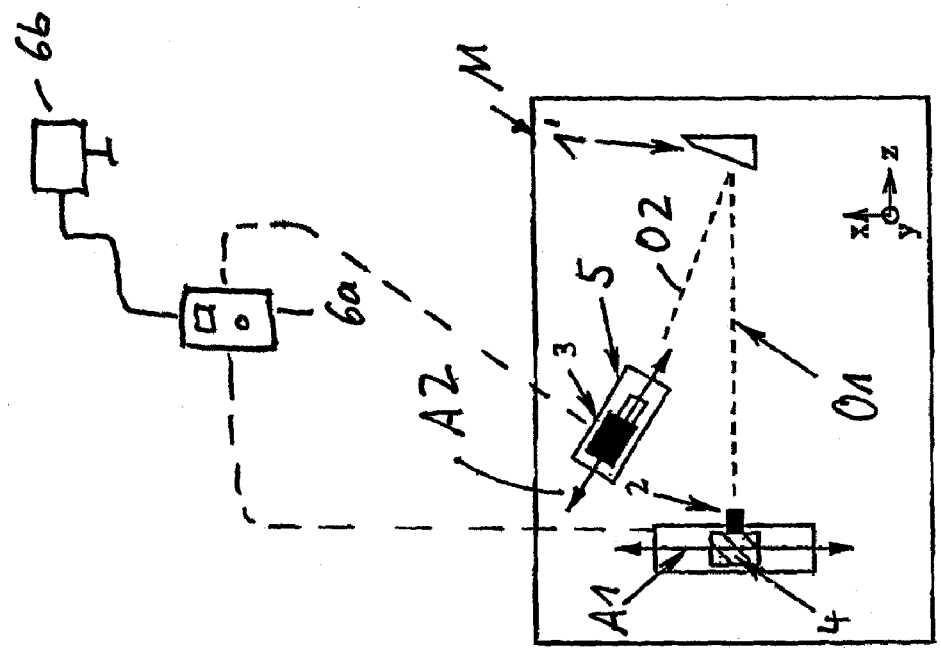
FIG. 5 is a diagrammatic elevation of a second embodiment of an apparatus for carrying out the method according to the invention.

FIG. 5 shows a diagrammatic elevation from the top of apparatus similar to that shown in FIG. 1, the same components being denoted by the same reference symbol. Here the components with the same reference symbols perform the same function as in FIG. 1 and thus are not explained in greater detail. The difference between the second embodiment in FIG. 5 and the embodiment shown in FIG. 1 consists in the fact that it is not lens 1 that is analyzed but a reflecting, wedge-shaped object 1'. There is therefore no longer any uniform optical axis O, but the measuring system comprises a first axis O1 between illuminating device 2 and measuring object 1', as well as a second axis O2 between measuring object 1' and displacing device 5. In FIG. 5 the measuring device is arranged in its reference position and the analysis is now carried out by scanning the surface of reflecting measuring object 1' by displacing the illuminating device in the directions represented by double arrow A1 by means of positioning system 4. In this case the beam path after reflection on measuring object 1' is detected for each set position by displacing sensor system 3 by means of displacing device 5 in the direction of double arrow A2. As in the embodiment in FIG. 1, the position of the test beam is therefore detected on the basis of its intensity distribution over sensor 3 and is displayed on monitor 6b by means of computer 6a.

Figure 6:
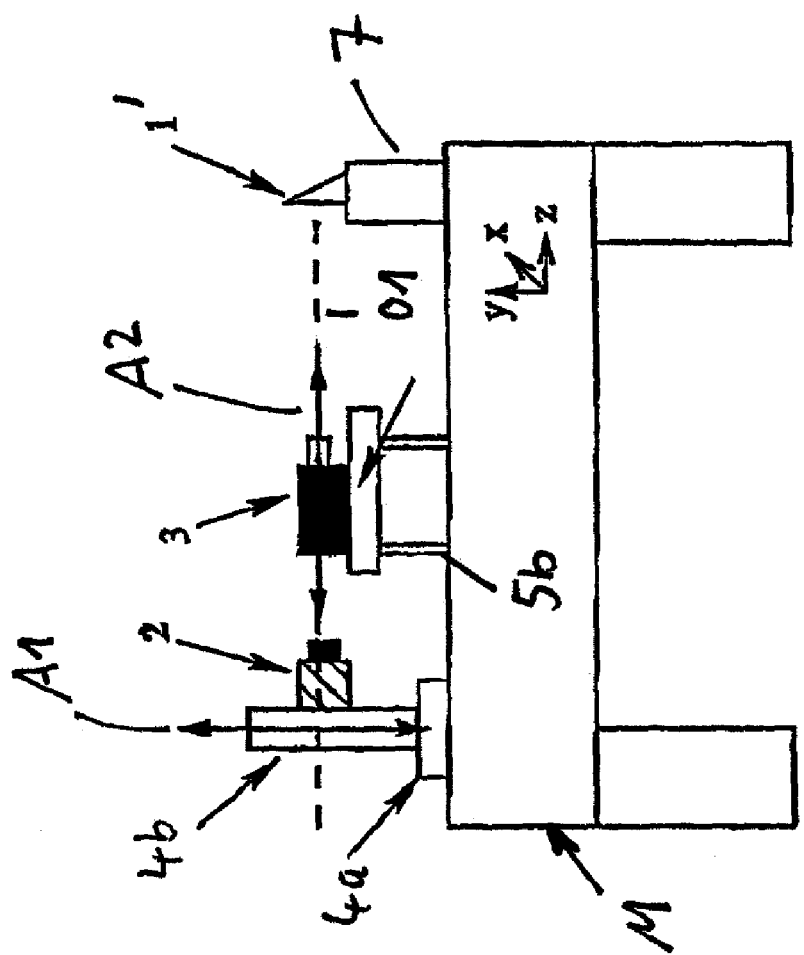
FIG. 6 is a side view of the apparatus shown in FIG. 5.

FIG. 6 shows a side view of the apparatus shown in FIG. 5. The structure of the individual components of the measuring system in FIG. 6 corresponds to the structure of the components in FIG. 2 and the same reference symbols are again used for the same components. As with the apparatus in FIG. 2, a base 7 is provided on which is arranged the optical device to be analyzed, which in FIG. 6 is the reflecting measuring object 1'. In particular, FIG. 6 shows that positioning system 4 for illuminating device 2 comprises a horizontal travel rail 4a and a vertical travel rail 4b. It can also be seen that displacing device 5 for sensor 3 consists of a horizontal travel rail 5a, which is arranged on a base 5b.

Figure 7:
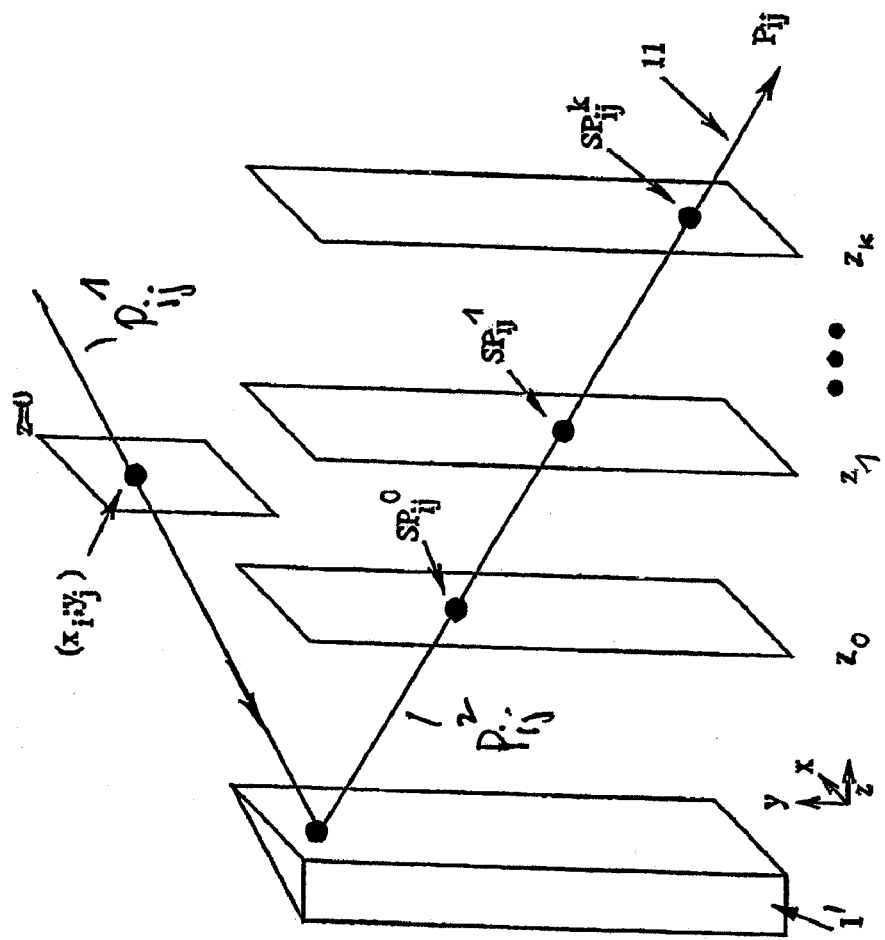
FIG. 7 is a diagrammatic perspective view of a plurality of planes of detection, similar to FIG. 4, for of the second embodiment of the device according to the invention.

FIG. 7 again illustrates the principle of displacement of the planes of detection, which has already been explained above with reference to FIG. 4. Unlike in FIG. 4, plane z=0 now denotes any plane in test beam path $P^1_{ij}$ from the illuminating device to measuring object 1'. Test beam $P^2_{ij}$ reflected on measuring object 1' is then detected in a similar manner as shown in FIG. 4 by a plurality of planes of detection $z_0$, z1, ... $z_0$, $z_1$, ..., $z_k$.

Figure 8:
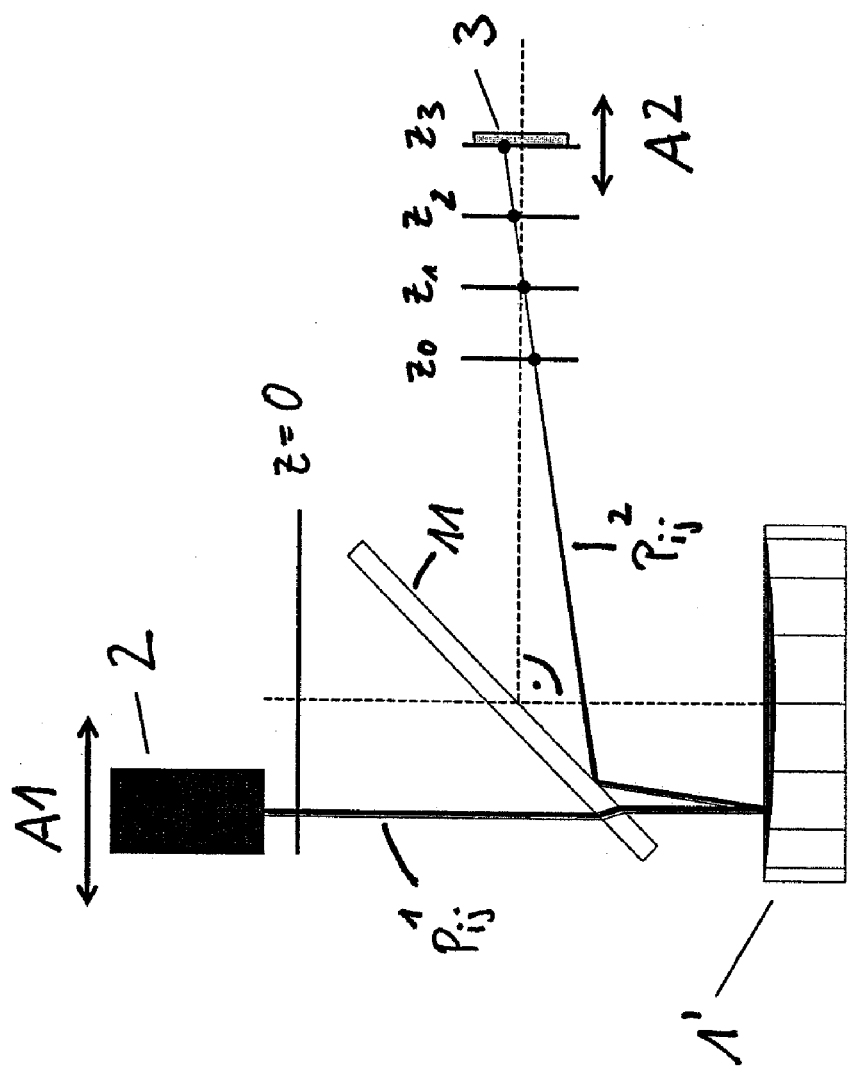
FIG. 8 is a diagrammatic elevation of a third embodiment of the apparatus according to the invention.

FIG. 8 shows in elevation a third embodiment of apparatus according to the invention for analysing an optical component. As with the second embodiment, a reflecting measuring object 1' is also analyzed again. The arrangement differs from the second embodiment in that a beam splitter 11 is arranged in beam path $P^1_{ij}$ from illuminating device 2 to measuring object 1'. In this case the beam splitter is positioned at an angle of 45° to direction $P^1_{ij}$. This enables sensor device 3 to be positioned essentially perpendicularly to illuminating device 2 and measuring object 1'. Sensor 3 is displaced in the directions denoted by double arrow A2 in order to detect the test beam in the different planes of detection $z_0$, $z_1$, $z_2$ and $z_3$. In the embodiment in FIG. 8, beam splitter 11 is a half-transparent mirror which transmits the radiation from illuminating device 2 to measuring object 1', whereas the radiation reflected by the measuring object is reflected on the beam splitter as far as sensor 3. As with the above embodiments, measuring object 1' is scanned by the movement of illuminating device 2, denoted by double arrow A1.

Figure 9:
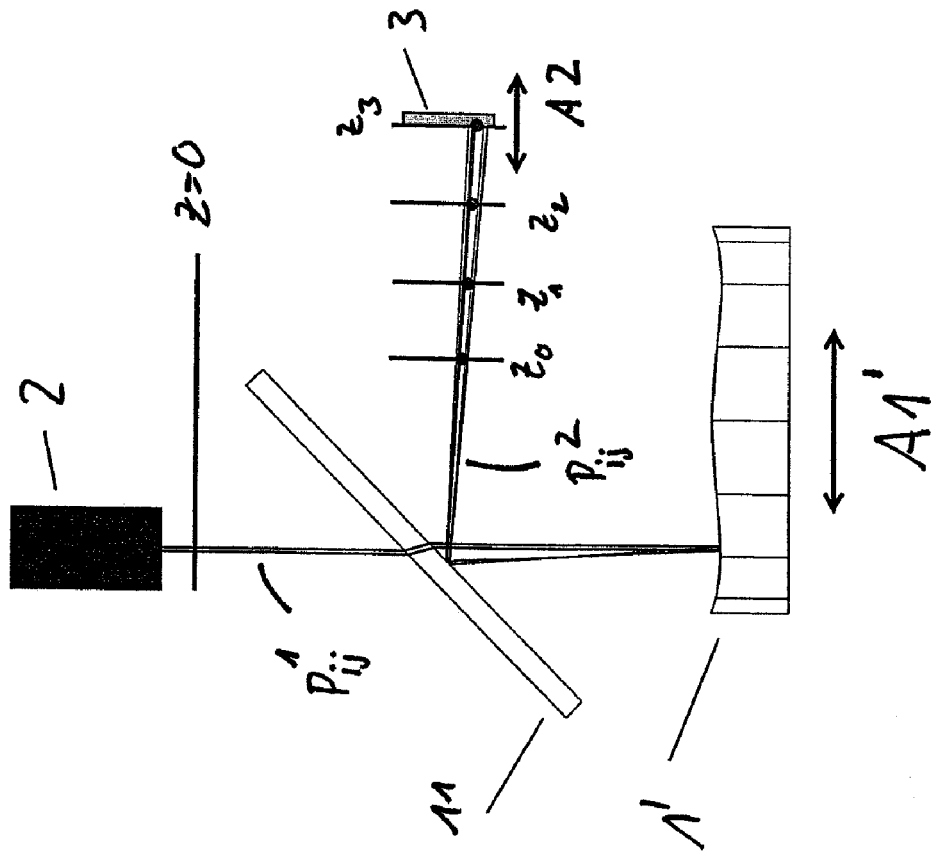
FIG. 9 is a diagrammatic elevation of a fourth embodiment of an apparatus according to the invention.

FIG. 9 shows in elevation a fourth embodiment of the apparatus according to the invention which corresponds in its essential components to the embodiment shown in FIG. 8. A detailed description of FIG. 9 is therefore dispensed with. The difference between FIG. 9 and FIG. 8 consists in that illuminating device 2 is not displaced for scanning the reflecting measuring object 1', but measuring object 1' itself is brought into different positions, as indicated by double arrow A1'. In the embodiment in FIG. 9 a positioning device (not shown) is therefore provided for measuring object 1', which is able to move the measuring object in the direction of arrow A1' and, if necessary, also in directions perpendicular to A1'. It is also possible for the apparatus to be designed so that both illuminating device 2 and measuring object 1' can be displaced towards each other with corresponding positioning devices.

The invention claimed is:

1. A method for analysing an optical device, comprising:
a) arranging an illuminating device which generates a test beam, the optical device and a position-resolving sensor device which detects the test beam, relative to each other in a reference position, wherein the reference position establishes a reference beam path which comprises a first direction of the test beam transmitted in the reference position from the illuminating device and directed towards the optical device, and a second direction of the test beam received in the reference position from the sensor device after the test beam passes the optical device;
b) arranging the test beam transmitted from illuminating device in a plurality of relative positions with respect to the reference position so that at least one of (i) the direction of the test beam is offset, in the respective relative position, with respect to the first direction, and (ii) the illuminating device and the optical device are offset, in the respective relative position, with respect to each other relative to the reference position, the test beam being incident upon a measuring point assigned to the respective relative position on the optical device;
c) detecting, for a respective relative position, the position of incidence of the test beam after it passes the optical device, by the sensor device on a plurality of planes of detection offset relative to each other along the second direction; and
d) determining the beam path of the test beam, after passing the optical device, from the positions of incidence detected in step c) for each relative position, and calculating optical characteristics of the optical device from the beam path;
wherein at least one of the gradient field of the optical wave front, or the optical wave front, after passing the optical device, or values dependent on the optical wave front, are calculated from the beam paths of the test beams determined step d).

2. The method according to claim 1, wherein the test beam goes through the optical device.

3. The method according to claim 2, wherein the optical device comprises a lens.

4. The method according to claim 1, wherein the test beam is scattered and/or reflected on the optical device.

5. The method according to claim 4, wherein the optical device comprises a reflecting measuring object, including at least one of a wafer and a plate and a part of a micromechanical sensor.

6. The method according to claim 4, further comprising arranging a beam splitter between the illuminating device and the optical device, the beam sputter at least partially transmits a test beam from the illuminating device and at least partially reflects a test beam reflected from the optical device.

7. The method according to claim 1, wherein the direction of the test beam transmitted from the illuminating device is parallel to the first direction in the respective relative position in step b).

8. The method according to claim 1, wherein further comprising using Zernicke polynomials to calculate the optical wave front, and values dependent on the optical wave front.

9. The method according to claim 1, in which the beam path of a respective test beam is determined by linear regression of the positions of incidence of the respective test beam in the planes of detection.

10. The method according to claim 1, wherein the reference position the reference beam path corresponds essentially to the course of the optical axis of the optical device, and in that the first direction corresponds to the second direction of the reference beam path.

11. The method according to claim 1, wherein the arrangement of the test beam in a plurality of relative positions with respect to the reference position is obtained by at least one of displacing the illuminating device and the optical device, including displacing in a plane essentially perpendicular to the first direction.

12. The method according to claim 1, wherein the measuring points assigned to the respective test beams are positioned essentially in a grid fashion with predetermined distances from each other on the optical device.

13. The method according to claim 1, wherein the plane or planes of detection are arranged essentially perpendicularly to the second direction.

14. The method according to claim 1, in which the positions of incidence of the respective test beams are determined in a plane of detection by evaluating the intensity distribution detected by the sensor device in the plane of detection.

15. Apparatus for analyzing an optical device, comprising:
an illuminating device for generating a test beam;
a position-resolving sensor device for detecting the test beam after it passes the optical device;
wherein the optical device to be analyzed, the illuminating device and the sensor device are arranged relative to each other in a reference position, wherein the reference position establishes a reference beam path which comprises a first direction of the test beam transmitted from the illuminating device and directed towards the optical device, and a second direction of the test beam received in the reference position from the sensor device after it passes the optical device;
a positioning device for arranging the test beam transmitted from the illuminating device in a plurality of relative positions with respect to the reference position so that at least one of (i) a direction of the test beam is offset, in the respective relative position, with respect to the first direction, and (ii) the illuminating device and the optical device are offset, in the respective relative position, with respect to each other relative to the reference position, the test beam being incident upon a measuring point assigned to the respective relative position on the optical device;
wherein the sensor device is designed so that it detects, for each relative position, a position of incidence of the test beam after it passes the optical device in a plurality of the planes of detection offset relative to each other along the second direction; and
a computer unit which is designed so as to determine, for each relative position, a beam path of the test beam, after it passes the optical device, from the positions of incidence detected by the sensor device, and to calculate optical characteristics of the optical device from the beam path;
wherein the computer unit is further designed to calculate, from the beam paths of the test beams at least one of the gradient field of the optical wave front, or the optical wave front, after passing the optical, or values dependent on the optical wave front.

16. The apparatus according to claim 15, wherein the positioning device is designed so that it displaces at least one of the illuminating device and the optical device for arranging the test beam in different relative positions essentially perpendicular to the first direction.

17. The apparatus according to claim 15, wherein a displacing device is provided for displacing the sensor device in order to set different planes of detection.

18. The apparatus according to claim 15, wherein at least one of the positioning device and the displacing are controlled by the computer unit so that at least one of the different relative positions and the planes of detection are set in an automated manner.

19. The apparatus according to claim 15, further comprising a beam splitter arranged between the illuminating device and the optical device, the beam splitter at least partially operable to transmit the test beam from the illuminating device and to at least partially reflect the test beam reflected by the optical device.

* * * * *